United States Patent [19]

Arai et al.

[11] Patent Number: 5,180,771

[45] Date of Patent: Jan. 19, 1993

[54] ROOM TEMPERATURE CURABLE ORGANOPOLYSILOXANE COMPOSITION

[75] Inventors: Masatoshi Arai; Yoshifumi Inoue; Yoshio Inoue, all of Annaka, Japan

[73] Assignee: Shin-Etsu Chemical Co., Ltd., Tokyo, Japan

[21] Appl. No.: 508,700

[22] Filed: Apr. 13, 1990

[30] Foreign Application Priority Data

Apr. 14, 1989 [JP] Japan .................................. 1-94960
Aug. 25, 1989 [JP] Japan .................................. 1-219031

[51] Int. Cl.$^5$ .............................................. C08K 5/16
[52] U.S. Cl. .................................... 524/588; 524/869; 524/858; 524/714; 528/34; 528/18; 528/22; 528/901; 556/438
[58] Field of Search ............... 524/588, 869, 858, 714; 528/34, 18, 22, 901; 556/438

[56] References Cited

U.S. PATENT DOCUMENTS

| | | | |
|---|---|---|---|
| 592,363 | 2/1960 | Speler | 528/41 |
| 4,472,551 | 9/1984 | White et al. | 524/728 |
| 4,667,007 | 5/1987 | Wengrovius et al. | 528/18 |
| 4,721,766 | 1/1988 | Inoue et al. | 524/588 |
| 4,734,479 | 3/1988 | Inoue et al. | 528/901 |
| 4,766,192 | 8/1988 | Gvozdic | 525/477 |
| 4,895,918 | 1/1990 | Lucas | 528/901 |

FOREIGN PATENT DOCUMENTS 2063630 12/1970 Fed. Rep. of Germany .
58-52351 3/1983 Japan .

Primary Examiner—Melvyn I. Marquis
Assistant Examiner—Karen A. Hellender
Attorney, Agent, or Firm—Oblon, Spivak, McClelland, Maier & Neustadt

[57] ABSTRACT

A room temperature curable organopolysiloxane composition comprising a diorganopolysiloxane having a hydroxyl group or alkoxy groups, a filler, a particular alkoxysilane, an organosilicon compound having a particular guanidinyl group, and an organic tin compound, and further comprising an organosilicon compound having at least one group represented by the general formula:

$$-\underset{\underset{R^6}{|}}{\overset{\overset{R^5}{|}}{Si}}-C(CH_2)_n COOR^4$$

where $R^4$ is a substituted or unsubstituted monovalent hydrocarbon group, or a substituted or unsubstituted phenyl group, $R^5$ and $R^6$ are each a hydrogen atom, methyl or ethyl group, and n is an integer of 0, 1 or 2. By virtue of the last component, the composition exhibits markedly good storage stability.

5 Claims, No Drawings

ROOM TEMPERATURE CURABLE ORGANOPOLYSILOXANE COMPOSITION

BACKGROUND OF THE INVENTION

1. Field of the Invention

This invention relates to a room temperature curable organopolysiloxane composition, particularly to a dealcoholation type room temperature curable organopolysiloxane composition.

2. Description of Prior Art

Various room temperature curable organopolysiloxane compositions (hereinafter abbreviated as RTV siloxane composition) have been known in the art.

Among them, compositions comprising crosslinking agents such as methyltrimethoxysilane or the like and a catalyst such as organic titanium compounds or organic titanium chelating compounds added to an organopolysiloxane having hydroxyl groups at terminal ends of its molecular chain will form rubbery organopolysiloxanes with generation of alcohol during curing. The compositions are not corrosive without generation of stimulative odor, and have been widely used as adhesives in electrical or electronic industries.

However, the dealcoholation type RTV siloxane composition of this kind generally has the disadvantages of slow curing rate, poor internal curability and poor storability, and has the drawback in the case of long term storage even if it may be under anhydrous state that it cannot be cured when used.

For this reason, it has been proposed to add a silane compound having two alkoxy groups as the so called silane scavenger to the dealcoholation type RTV siloxane composition, thereby improving its storage stability and curability.

Also, as a dealcoholation type RTV siloxane composition, there has been proposed one comprising a diorganopolysiloxane terminated with hydroxyl groups at its ends of the molecular chain, and, in addition thereto, an alkoxysilane or a partial hydrolysis product thereof, a guanidinyl-substituted alkylalkoxysilane represented by the following formula:

[(CH$_3$)$_2$N]C=N(CH$_2$)$_3$Si(OCH$_3$)$_3$ and an organic tin compound (see Japanese Pre-examination Patent Publication (KOKAI) No. 52351/1983).

However, in the composition wherein the above-mentioned silane compound having two alkoxy groups is added as the silane scavenger, for improvement of storage stability, hydrolyzable groups other than the two alkoxy groups of the silane compound are required to be made those having high reactivity such as amide group, amino group, etc. However, since these groups bring about corrosiveness and odor, the RTV siloxane composition can not be used as adhesives in electrical, electronic industries.

Also, the composition described in Japanese Pre-examination Patent Publication (KOKAI) No. 52351/1983 is stated to have good storage stability. But, in fact, as free alcohol forms through the reaction of silanol groups in the diorganopolysiloxane with alkoxysilane or partial hydrolysis product thereof and remains in the composition, storability is extremely poor.

SUMMARY OF THE INVENTION

Accordingly, an object of the present invention is to provide a dealcoholation type RTV siloxane composition which has good storage stability and is free from corrosiveness, odor, etc.

The present invention provides, as one which solves the problems, room temperature curable organopolysiloxane composition comprising:

(A) 100 parts by weight of a diorganopolysiloxane having a hydroxyl group at its both terminal ends or 2 or 3 C$_1$-C$_4$ alkoxy groups at each terminal end;
(B) 1 to 400 parts by weight of a filler;
(C) 0 to 50 parts by weight of an alkoxysilane represented by the general formula (I):

$$(R^1)_m Si(OR^2)_{4-m} \quad (I)$$

where R$^1$ is a substituted or unsubstituted C$_1$-C$_{20}$ monovalent hydrocarbon groups, R$^2$ is a C$_1$-C$_4$ alkyl group or a C$_2$-C$_4$ alkoxyalkyl group, m is an integer of 0 or 1, or a partial hydrolysis product thereof;

(D) 0.01 to 10 parts by weight of an organosilicon compound having at least one group represented by the general formula (II):

$$[(R^3)_2N]_2C=N- \quad (II)$$

where R$^3$ is a hydrogen atom or a C$_1$-C$_6$ monovalent hydrocarbon group, in its molecule;

(E) 0.01 to 10 parts by weight of an organic tin compound;

(F) 0.1 to 20 parts by weight of an organosilicon compound having at least one group represented by the general formula (III):

$$\begin{array}{c} R^5 \\ | \\ -C(CH_2)_n COOR^4 \\ | \\ R^6 \end{array} \quad (III)$$

where R$^4$ is a substituted or unsubstituted C$_1$-C$_{20}$ monovalent hydrocarbon group, or a substituted or unsubstituted phenyl group, R$^5$ and R$^6$ are each a hydrogen atom, methyl or ethyl group, and n is an integer of 0, 1 or 2.

The present inventors have studied about the causes of poor storage stability and curability of the dealcoholation type RTV siloxane compositions known in the art, and consequently found that they are due to the facts (1) that the reactivity of the hydroxyl groups of the organosiloxane having hydroxyl groups at its ends with the alkoxyl groups in the silane compound having alkoxyl groups, which are to be reacted with water contained in the filler, is low, thereby allowing unreacted silanol groups to remain, and also (2) that free alcohols formed by the reaction of the silane compound having alkoxy groups with the hydroxyl group are present in the composition.

Therefore, if the filler of the component (B) is mixed with the above component (A), and thereafter an alkoxysilane or a partial hydrolysis product thereof of the component (C), the organosilicon compound containing guanidinyl group of the component (D) and the organic tin compound of the component (E) are mixed with the mixture so obtained under shield from air, the silanol groups and water contained in the components (A) and (B) react with the alkoxysilane or its partial hydrolysis product of the component (C), whereby silanol groups disappear in the mixture but alcohols remain in the composition. The present inventions has discovered that addition of an organosilicon compound of the component (F) to the mixture thus obtained, the remaining alcohols are removed by the reaction with this organosilicon compound.

As described above, the RTV siloxane composition having excellent storage stability and curability could be obtained.

The composition of the present invention is stable under hermetically sealed state and, when exposed to air, quickly cured to become an elastic material. The composition is particularly excellent in storage stability and curability, and therefore, for example, it can be cured quickly to give a cured product having excellent physical properties when exposed to air even after storage for 6 months. The composition will release no toxic or corrosive gas during curing, and will not generate rust on the treated surface, and further the cured product can be well adhered to various substrates, particularly metal surfaces. Hence, it is not only useful as adhesive material for electrical, electronic parts, but also can be used widely as a sealant, caulking material, coating material, water repellent, mold release material for various substrates, and also as a fiber treating agent.

DETAILED DESCRIPTION OF PREFERRED EMBODIMENTS

(A) Organopolysiloxane

The diorganopolysiloxane of the component (A) the main ingredient of this composition, and this may include, for example, those represented by the average composition formula:

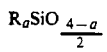

where, R is independently a substituted or unsubstituted $C_1$-$C_{10}$, preferably $C_1$-$C_8$ monovalent hydrocarbon group, and a is a number of 1.90 to 2.05, and having a hydroxyl group at both terminal ends, or 2 or 3 $C_1$-$C_4$ alkoxy groups at each terminal end.

Examples of R may include alkyl groups such as methyl, ethyl, propyl, butyl, 2-ethylbutyl, octyl groups and the like; cycloalkyl groups such as cyclohexyl, cyclopentyl groups and the like; alkenyl groups such as vinyl, allyl, hexenyl groups and the like; aryl groups such as phenyl, tolyl, xylyl, naphthyl, diphenyl groups and the like; aralkyl groups such as benzyl, phenylethyl groups and the like; or corresponding substituted hydrocarbon groups in which a part or all of hydrogen atoms bonded to carbon atoms have been substituted with halogen atoms, cyano group, etc., such as chloromethyl group, trifluoropropyl group, 2-cyanoethyl group, 3-cyanopropyl group, etc.

In order that the cured product obtained from the composition of the present invention may exhibit good rubber elasticity and have good mechanical strength, the component (A) should preferably have a viscosity 25 cSt or higher at 25° C.

(B) Filler

The filler as the component (B) in the composition of the present invention may be any one known in the art, including, for example, fine powdery silica, silica aerogel, precipitated silica, diatomaceous earth, metal oxides such as iron oxide, zinc oxide, titanium oxide, etc., or these treated on the surface with silane, metal carbonates such as calcium carbonate, magnesium carbonate, zinc carbonate, etc., asbestos, glass wool, carbon black, fine powdery mica, fused silica powder, powders of synthetic resin such as polystyrene, polyvinyl chloride, polypropylene, etc.

The amount of the component (B) may be within the range from 1 to 400 parts by weight, preferably 5 to 200 parts by weight, based on 100 parts by weight of the above component (A).

If the amount is less than 1 part by weight, the cured product obtained from this composition will not exhibit sufficient mechanical strength, while if it exceeds 400 parts by weight, the viscosity of the composition obtained is increased to not only worsen workability, but also lower the rubber strength after curing, whereby desired rubber elasticity can be obtained with difficulty.

(C) Alkoxysilane or its Partial Hydrolysis Product

Next, the alkoxysilane as the component (C) in the composition of the present invention is represented by the general formula (I):

In the general formula (I), the substituted or unsubstituted $C_1$-$C_{20}$ monovalent hydrocarbon group represented by $R^1$ includes, for example, methyl, ethyl, propyl, vinyl, allyl, phenyl, trifluoropropyl groups, etc.

The $C_1$-$C_4$ alkyl group represented by $R^2$ may include, for example, methyl, ethyl, propyl, butyl groups and the like, and the alkoxyalkyl group may be, for example, methoxyethyl, ethoxyethyl groups and the like.

As the alkoxysilane of the component (C), there can be used specifically methyltrimethoxysilane, vinyltrimethoxysilane, tetramethoxysilane, tetraethoxysilane, methyltriethoxysilane, ethyltrimethoxysilane, methyltriisopropoxysilane, phenyltrimethoxysilane, phenyltri(methoxyethoxy)silane, vinyltri(methoxyethoxysilane), tetra(ethoxyethoxy)silane, trifluoropropyltrimethoxysilane, etc., and also partial hydrolysis products of these, namely partially hydrolyzed condensed siloxanes may be employed.

Among the compounds as exemplified above, methyltrimethoxysilane, vinyltrimethoxysilane, phenyltrimethoxysilane, tetramethoxysilane, methyltri(methoxyethoxy)silane, and vinyltri(methoxyethoxy)silane are preferred.

The amount of the component (C) may be within the range from 0 to 50 parts by weight, preferably from 0 to 10 parts by weight, based on 100 parts by weight of the component (A). If the component (A) is more than 50 parts by weight, the cured product of the composition obtained becomes poor in rubber elasticity, and also disadvantageous economically.

The component (C) is not particularly required to be added, where an organosilicon compound having an alkoxy group is used as the component (F) described below. However, it should be added in an amount of at least one part by weight or more, where an organosilicon compound having no alkoxy group is employed as the component (F).

(D) Organosilicon Compound

The organosilicon compound as the component (D) to be used in the present invention acts as a catalyst in silylating water and silanol in the base compound with the above-mentioned component (C).

The organosilicon compound, as described above, has at least one group represented by the general formula (II):

$$[(R^3)_2N]_2C=N- \quad (II)$$

where $R^3$ is as defined above, in its molecule.

The group of the above formula (II) may be linked to a silicon atom through any group, but may be generally preferred to be linked to a silicon atom through a $C_2$-$C_4$ alkylene group or a $C_4$-$C_6$ oxyalkylene group.

Examples of the organosilicon compound of the component (D) may include, for example, those represented by the following formulae:

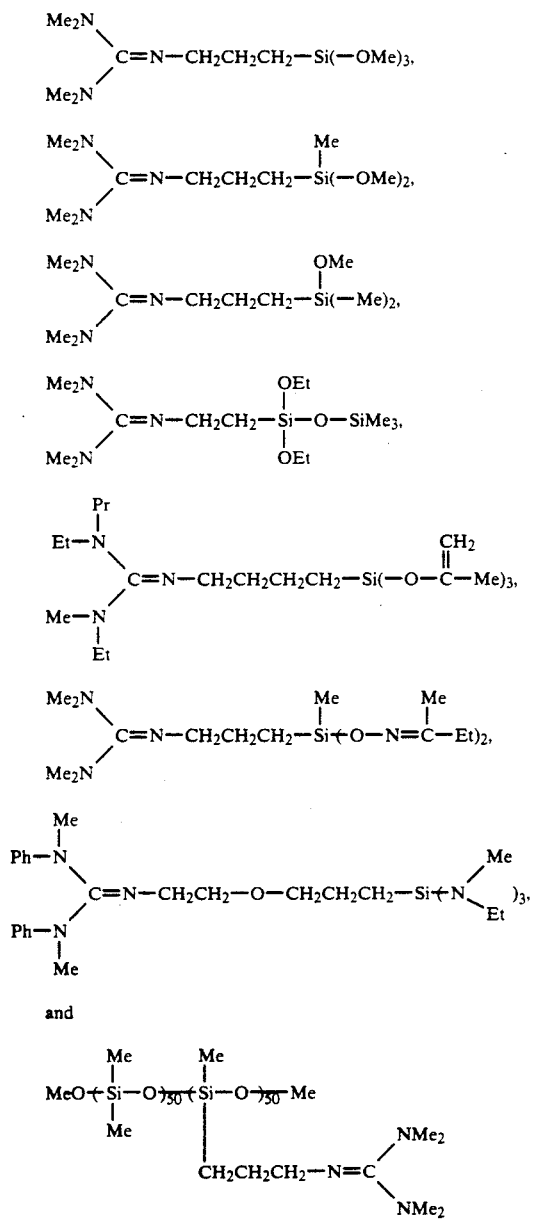

and

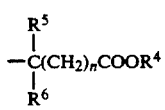

in the above formulae, Me represents the methyl group, Et the ethyl group, Pr the propyl group, and Ph the phenyl group.

Among these, for easiness in synthesis, organosiloxanes represented by the following formula may be preferably employed.

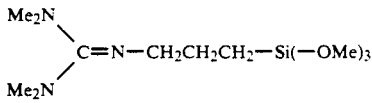

The amount of the compound (D) added may be within the range from 0.01 to 10 parts by weight, preferably, from 0.1 to 5 parts by weight, based on 100 parts by weight of the component (A). If the amount of the component (D) is to small, the action of accelerating the reaction of the base compound comprising the components (A) and (B) with the component (C) is insufficient, whereby a long time is required for the reaction, and also hydroxyl groups and water remain in the reaction product to lower storage stability of the composition. On the other hand, if the component (D) is too much, there is fear of color change of the reaction product, and it is also economically disadvantageous.

(E) Organic Tin Compound

In the composition of the present invention, the organic tin compounds used as the component (E) has been known in the art as a condensation reaction catalyst used in the compositions of this type. The organic tin compounds include, for example, carboxylates such as tin naphthenate, tin caprylate, tin oleate, etc., dibutyl tin diacetate, dibutyl tin dioctoate, dibutyl tin dilaurate, dibutyl tin dioleate, diphenyl tin diacetate, dibutyl tin oxide, dibutyl tin dimethoxide, dibutyl bis(triethoxysiloxy)tin, dibutyl tin dibenzylmaleate, etc.

The amount of the component (E) added may be in the range from 0.01 to 10 parts by weight, preferably 0.1 to 2 parts by weight, based on 100 parts by weight of the component (A).

If the amount of the component (E) is too small, it does not function as the curing catalyst sufficiently, whereby the curing time becomes longer, and also curing at the deep portion in the rubber layer becomes insufficient.

Further, if the amount of the component (E) is too large, the storage stability of the composition becomes lower.

(F) Organosilicon Compound

The organosilicon compound to be used as the component (F) has at least one group represented by the formula (III):

$$-\underset{R^6}{\overset{R^5}{|}}C(CH_2)_nCOOR^4 \quad (III)$$

where $R^4$, $R^5$, $R^6$ and n are as defined above, in the molecule. The group of the formula (III) normally is bonded to a silicon atom in the molecule. In the formula (III), $R^4$ is a substituted or unsubstituted $C_1$-$C_{20}$ monovalent hydrocarbon group, e.g., alkyl groups such as methyl, ethyl, butyl, hexyl, octyl and the like, and the phenyl group; $R^5$ and $R^6$ may be the same or different and each represent any of the hydrogen atom, the methyl group or the ethyl group; and n is an integer of from 0 to 2.

The organosilicon compound to be used as the component (F) reacts with the alcohols generated in the reaction of the silanol groups and water contained in the diorganopolysiloxane of the component (A) and the filler of the component (B) with the alkoxysilane or its partial hydrolysis product of the component (C) as shown by the following reaction equation, thereby the alcohols being removed.

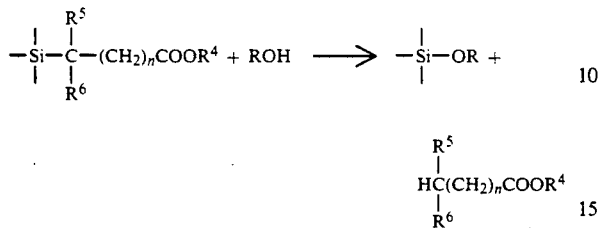

wherein, $R^4$, $R^5$, $R^6$ and n are as defined above, and R is an alkyl group.

The alkoxysilane or the alkoxysiloxane, and the ester compound formed in the above reaction have no adverse effect on the composition of the present invention. By addition of the organosilicon compound, the composition of the present invention becomes excellent in storage stability.

The organosilicon compound of the component (F) added may be used in an amount such that the molar ratio of the group:

possessed by the component (F) to ROH is 1 or more, since the reaction with alcohol proceeds easily and stoichiometrically. Generally, the amount of the component (F) may be 0.1 to 20 parts by weight, preferably from 0.1 to 10 parts by weight, per 100 parts by weight of the component (A). If the amount of the component (F) is too small, the alcohol may remain int he composition. On the other hand, the component (F) in excess of 20 parts by weight is not necessary and economically disadvantageous.

As the component (F), the following compounds can be exemplified:

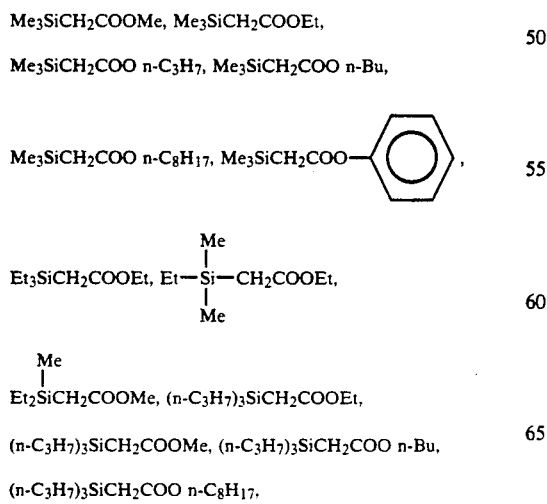

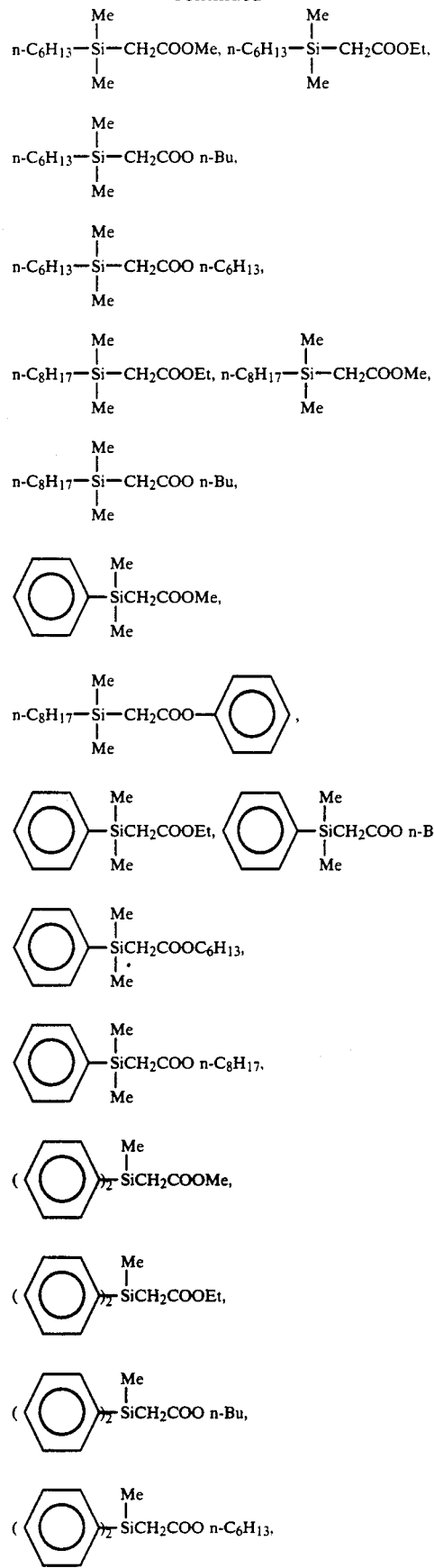

-continued

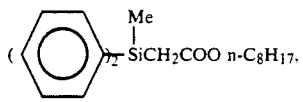

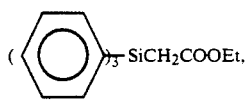

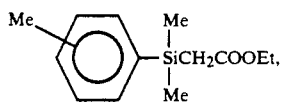

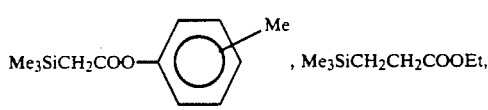, Me₃SiCH₂CH₂COOEt,

Et₃SiCH₂CH₂COOMe, Me₃SiCHCOOEt,
                          |
                          Me

Me₃SiCHCOOMe, (MeO)₃SiCH₂COOEt,
    |
    Me (MeO)₂SiCH₂COOEt, (MeO)₃SiCH₂COOMe,
      |
      Me (MeO)SiCH₂COOEt, (MeO)₃SiCH₂COO n-C₄H₉,
     |
     Me

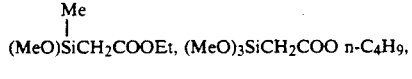

(MeO)₂SiCH₂COOC₈H₁₇, (MeO)₃SiCH₂COO n-C₈H₁₇,

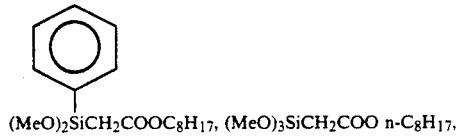, (EtO)₃SiCH₂COOEt, (BuO)₃SiCH₂COOEt,

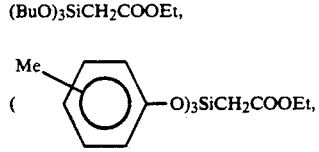

(EtO)₃SiCH₂COO n-C₄H₁₉, (EtO)₃SiCH₂COO n-C₈H₁₇, (MeO)₃SiCHCOOEt, (MeO)₃SiCH₂COOMe,
       |
       Me (MeO)₃SiCH₂CH₂SiCH₂COOEt,
              |
              Me

Me  Me  Me
        |   |   |
O(SiO)ₙSiCH₂CH₂SiCH₂COOEt]₂
        |   |   |
        Me  Me  Me
where n is an integer of 0-20, Me           Me                    Me           Me
        |            |                     |            |
O(SiO)ₙSiCH₂COOEt]₂       O(SiO)ₙSiCH₂COOMe]₂
        |            |                     |            |
        Me           Me                    Me           Me
where n is an integer of 0-20,   where n is an integer of 0-20, Me                        Me
        |                         |
Me—SiCH₂COOMe,  Me—SiCH₂COOEt,
        |                         |
        CH₂                       CH₂
        |                         |
        CH₂                       CH₂
        |                         |
     [SiO]₄                    [SiO]₄
        |                         |
        Me                        Me OMe                  OEt
       |                    |
MeSi(CH₂COOEt)₂,  MeSi(CH₂COOEt)₂, Me                        Me
        |                         |
Me₃SiOSiOSiMe₃         Me₃SiOSiOSiMe₃
        |                         |
        CH₂                       CH₂
        |                         |
        CH₂                       CH₂
        |                         |
Me₂SiCH₂COOMe,         Me₂SiCH₂COOEt,

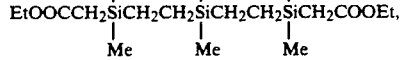

Me      Me      Me
        |       |       |
EtOOCCH₂SiCH₂CH₂SiCH₂CH₂SiCH₂COOEt,
        |       |       |
        Me      Me      Me

Me      Me
        |       |
MeOOCCH₂SiCH₂CH₂SiCH₂COOMe,
        |       |
        Me      Me

Me      Me
        |       |
Me₃SiOSiCH₂CH₂SiCH₂COOBu, and
        |       |
        Me      Me Me
                    |
(Me₃SiO)₃SiCH₂CH₂SiCH₂COOC₈H₁₇,
                    |
                    Me in the above formula, Bu shows butyl group.

Particularly, silanes or siloxanes having an alkoxy group among the organosilicon compound (F) shown above have both of the functions as scavenger and curing agent. Therefore, where the organosilicon compound of this type is used as the component (F), no component (C) is particularly required to be added.

In the present invention, as the component (F), partial hydrolysis products of the compounds as enumerated above, namely partially hydrolyzed and condensed siloxanes can be used.

Preparation of Composition

The composition of the present invention can be obtained by mixing the components (A)-(F) as described above. In carrying out this preparation, the components (A)-(F) as described above may be mixed at one, or alternatively the components (A)-(E) may be mixed under hermetical sealing and reduced pressure, and then the organosilicon compound of the component (F) may be added and mixed. In this case, the mixing temperature may be preferably from room temperature to 100° C.

In the composition of the present invention, if necessary, various additives known in the art can be added, for example, thixotropic agents such as polyethylene glycol and derivatives thereof, etc., pigment, dyes, age resisters, antioxidants, antistatic agents, flame retardants such as antimony oxide, chlorinated paraffin, etc., thermal conductivity improvers such as boron nitride, aluminum oxide, etc., adhesiveness imparting agents, so called carbon functional silanes having an amino group, epoxy group, or thiol group, metal salts of carboxylic acids, metal alcoholates, etc. For workability during usage, the composition can be diluted with hydrocarbon solvents such as toluene and petroleum ether, ketones, ester, or the like.

EXAMPLES

The present invention is described specifically by way of working examples. In the following, parts denotes parts by weight, and the viscosity is given as the value measured at 25° C.

EXAMPLE 1

To 88 parts of a dimethylpolysiloxane blocked with hydroxyl groups at both terminal ends of its molecular chain (viscosity 20,000 cP) were added 9 parts of a fumed silica treated on the surface with hexamethyldisilazane and 3 parts of a fumed silica treated on the surface with a cyclic dimethylpolysiloxane, followed by uniform mixing, to prepare a base compound.

Next, to 100 parts of said base compound were added 5 parts of vinyltrimethoxysilane, 0.5 part of γ-tetramethylguanidinyl-propyltrimethoxysilane and 0.2 part of dibutyl tin dimethoxide, and after mixing under reduced pressure for 60 minutes, 2 parts of ethyl trimethylsilylacetate (Me$_3$SiCH$_2$COOEt), followed by stirring under shield from moisture and reduced pressure for 10 minutes, to prepare a RTV siloxane composition.

Then, the composition was extruded into a sheet of 2 mm in thickness, and exposed to air of 23° C. and 55% RH, whereby it dried to the touch in 5 minutes. The physical properties of the cured product obtained by leaving said sheet to stand under the same atmosphere for 7 days are shown in Table 1. The physical properties of the sheets with a thickness of 2 mm prepared from the above compositions left to stand in a hermetically sealed vessel at 70° C. for 7 days, or left to stand at 23° C. for 6 months are shown in Table 1.

From the results in Table 1, it was confirmed that the composition was excellent in storage stability and the physical properties of the cured product obtained by curing after storage.

TABLE 1

| | Time for drying to the touch (min.) | Properties of cured product* | | |
|---|---|---|---|---|
| | | Hardness (JIS) | Elongation (%) | Tensile strength (kg/cm²) |
| Initial properties | 7 | 26 | 450 | 20 |
| After storage at 70° C. × 7 days | 7 | 26 | 430 | 19 |
| After storage at 23° C. × 6 months | 7 | 25 | 410 | 18 |

*(Note) Physical properties; measured according to the method of JIS K-6301

EXAMPLES 2-6, COMPARATIVE EXAMPLES 1-2

To 100 parts of the base compound prepared in Example 1 were added and mixed the alkoxy silane, the guanidine group-containing silane, the organic tin compound and the silane containing the group represented by the above formula (III) shown in Table 2 in the amounts indicated respectively, followed by the treatment similarly as in Example 1, to prepare 7 kinds of compositions. Sheets with a thickness of 2 mm were prepared from these compositions, those stored at 70° C. for 7 days and those stored at 23° C. for 6 months. These sheets were cured at 23° C., in an atmosphere of 55% RH, at room temperature. The physical properties of the cured products obtained were examined according to the method of JIS K-6301. The results as shown in Table 2 were obtained.

TABLE 2

| | Example | | | | | Comparative Example | |
|---|---|---|---|---|---|---|---|
| | 2 | 3 | 4 | 5 | 6 | 1 | 2 |
| Composition (parts) | | | | | | | |
| Base compound | 100 | 100 | 100 | 100 | 100 | 100 | 100 |
| Methyltrimethoxysilane | 5 | — | — | — | — | 5 | — |
| Vinyltrimethoxysilane | — | 6 | — | — | — | — | 6 |
| 1,3-Divinyl-1,3-tetramethoxydisiloxane | — | — | 6 | 7 | — | — | — |
| γ-Tetramethylguanidinylpropyltrimethoxysilane | 0.5 | 0.5 | 0.5 | 0.5 | 0.5 | 0.5 | 0.5 |
| Dibutyl tin dimethoxysilane | — | 0.1 | — | 0.2 | — | 0.1 | 0.1 |
| Dibutyl tin dilaurate | — | — | 0.1 | — | 0.2 | — | — |
| Dibutyl tin maleate | 0.2 | — | — | — | — | — | — |
| Octyltrimethylsilyl acetate (a)* | — | 3 | — | 1 | — | — | — |
| Butyltriethylsilyl acetate (b) | 2 | — | — | — | — | — | — |
| 1,3,5,7-Tetramethyl-1,3,5,7-tetra-2-(carboethoxymethyl dimethylsilyl) (c) ethylcyclotetrasiloxane | — | — | 2 | — | — | — | — |
| Ethyltrimethoxysilyl acetate (d) | — | — | — | — | 6 | — | — |
| Initial properties | | | | | | | |
| Time for drying to the touch (min) | 5 | 3 | 4 | 3 | 5 | 8 | 6 |
| Hardness | 22 | 24 | 21 | 25 | 23 | 25 | 25 |
| Elongation (%) | 430 | 420 | 440 | 410 | 410 | 450 | 410 |
| Tensile strength (kg/cm²) | 18 | 19 | 17 | 20 | 18 | 18 | 19 |
| After storage at 70° C. × 7 days | | | | | | | |
| Time for drying to the touch (min) | 5 | 4 | 4 | 4 | 5 | 45 | 60 |
| Hardness | 22 | 23 | 23 | 26 | 23 | 12 | 8 |
| Elongation (%) | 430 | 420 | 450 | 430 | 450 | 150 | 130 |
| Tensile strength (kg/cm²) | 18 | 19 | 16 | 19 | 18 | 5 | 4 |

TABLE 2-continued

|  | Example | | | | | Comparative Example | |
|---|---|---|---|---|---|---|---|
|  | 2 | 3 | 4 | 5 | 6 | 1 | 2 |
| After storage at 23° C. × 6 months | | | | | | | |
| Time for drying to the touch (min) | 5 | 5 | 5 | 5 | 5 | 38 | 70 |
| Hardness | 22 | 23 | 23 | 25 | 23 | 13 | 6 |
| Elongation (%) | 410 | 400 | 420 | 430 | 450 | 150 | 80 |
| Tensile strength (kg/cm²) | 17 | 18 | 15 | 19 | 17 | 6 | 3 |

(Note) *The compounds (a)-(d) shown in Table 2 are represented by the following structural formulae:
(a) Me$_3$SiCH$_2$COO n-C$_8$H$_{17}$
(b) Et$_3$SiCH$_2$COO n-Bu
(c) Me$_2$SiCH$_2$COOEt
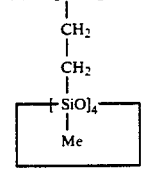
(d) (MeO)$_3$SiCH$_2$COOEt

EXAMPLE 7

30 Parts of a dimethylpolysiloxane having 3 alkoxy groups in total at its terminal ends of the molecular chain and having a viscosity of 50,000 cP, 20 parts of a dimethylpolysiloxane blocked with trimethylsilyl groups at both terminal ends of the molecular chain having a viscosity of 100 cP and 50 parts of calcium carbonate treated on the surface with a mixture of long chain fatty acid esters having 14 to 20 carbon, atoms were mixed uniformly to prepare a base compound.

Next, to 100 parts of the base compound were added 0.5 part of 3-(tetramethylguanidyl)propyltrimethoxysilane and 0.1 part of dibutyl tin benzylmaleate, and further 2 parts of:

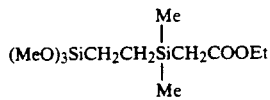

under shield from moisture, followed by mixing for 15 minutes and further defoaming by mixing under reduced pressure for 15 minutes, to prepare a RTV siloxane composition.

Then, the composition was extruded to prepare a sheet with a thickness of 2 mm. The sheet was exposed to air of 23° C., 55% RH. It dried to the touch in 7 minutes. The cured product obtained by leaving the sheet for 7 days exhibited physical properties as shown in Table 3. Sheets with a thickness of 2 mm were prepared form the compositions left to stand in a hermetically sealed vessel at 70° C. for 7 days or at 23° C. for 6 months and the physical properties of the cured products obtained according to the same treatment as described above are also shown in Table 3.

TABLE 3

| Time for drying to the touch (min.) | Properties of cured product* | | |
|---|---|---|---|
| | Hardness (JIS) | Elongation (%) | Tensile strength (kg/cm²) |
| Initial properties 5 | 24 | 580 | 20 |
| After storage at 70° C. × 7 days 5 | 23 | 560 | 20 |
| After storage at 23° C. × 6 months 5 | 24 | 560 | 18 |

*(Note) Physical properties; measured according to the method of JIS K-6301

We claim:
1. A room temperature curable organopolysiloxane composition comprising:
(A) 100 parts by weight of a diorganopolysiloxane having a hydroxyl group at both terminal ends of its molecular chain, or 2 or 3 C$_1$-C$_4$ alkoxy groups at each terminal end of its molecular chain;
(B) 1 to 400 parts by weight of a filler;
(C) 0 to 50 parts by weight of an alkoxysilane represented by the general formula (I)

$$(R^1)_m Si(OR^2)_{4-m} \quad (I)$$

where $R^1$ is a substituted or unsubstituted C$_1$-C$_{20}$ monovalent hydrocarbon group, $R^2$ is a C$_1$-C$_4$ alkyl group or a C$_2$-C$_4$ alkoxyalkyl group, m is an integer of 0 or 1, or a partial hydrolysis product thereof;
(D) 0.01 to 10 parts by weight of an organosilicon compound having at least one group represented by formula (II):

$$[(R^3)_2 N]_2 C=N- \quad (II)$$

where $R^3$ is a hydrogen atom or a C$_1$-C$_6$ monovalent hydrocarbon group, in its molecule;
(E) 0.01 to 10 parts by weight of an organic tin compound;
(F) 0.1 to 20 parts by weight of an organosilicon compound having at least one group represented by the formula (III)

where $R^4$ is a substituted or unsubstituted C$_1$-C$_{20}$ monovalent hydrocarbon group, or a substituted or unsubstituted phenyl group, $R^5$ and $R^6$ are each a hydrogen atom, methyl or ethyl group, and n is an integer of 0, 1 or 2.

2. The composition of claim 1, wherein the group represented by said formula (III) contained in the organosilicon compound of said component (F) is linked to a silicon atom.

3. The composition of claim 1, wherein said organosilicon compound of the component (F) contains a C$_1$-C$_4$ alkoxy group in addition to the group of formula (III), and the alkoxysilane or its partial hydrolysis product of the component (C) is not contained in the composition.

4. The composition of claim 1, wherein said organosilicon compound of the component (F) contains no alkoxy group, and the alkoxysilane or its partial hydrolysis product of the component (C) is contained in the composition in an amount of from 1 to 50 parts by weight per 100 parts by weight of said component (A).

5. The composition of claim 1, wherein the group represented by formula (II) is linked to a silicon atom through a C$_2$-C$_4$ alkylene group or a C$_4$-C$_6$ oxyalkylene group.

* * * * *